United States Patent
Phillip et al.

(10) Patent No.: US 7,473,407 B2
(45) Date of Patent: Jan. 6, 2009

(54) MAGNETIC SEPARATION PROCESS FOR TRONA

(75) Inventors: James D. Phillip, Green River, WY (US); William E. Stuble, Green River, WY (US); Mike J. Ventura, Green River, WY (US); Donald M. Robertson, Green River, WY (US)

(73) Assignee: Solvay Chemicals, Houston, TX (US)

( * ) Notice: Subject to any disclaimer, the term of this patent is extended or adjusted under 35 U.S.C. 154(b) by 790 days.

(21) Appl. No.: 10/993,315

(22) Filed: Nov. 19, 2004

(65) Prior Publication Data
US 2006/0108271 A1 May 25, 2006

(51) Int. Cl.
*B03C 1/00* (2006.01)

(52) U.S. Cl. .......................... 423/206.1; 209/3; 209/4; 209/7; 209/8; 241/23

(58) Field of Classification Search .............. 423/206.1; 209/3, 4, 7, 8, 12.1, 38; 241/23
See application file for complete search history.

(56) References Cited

U.S. PATENT DOCUMENTS

| 4,341,744 A | 7/1982 | Brison et al. |
| 4,375,454 A | 3/1983 | Imperto et al. |
| 4,478,711 A | 10/1984 | Cohen et al. |
| 4,565,624 A | 1/1986 | Martinez |
| 4,594,149 A | 6/1986 | Andres et al. |
| 4,659,457 A | 4/1987 | Martinez |
| 4,755,302 A | 7/1988 | Unkelbach et al. |
| 4,781,298 A | 11/1988 | Hemstock et al. |
| 4,819,808 A | 4/1989 | Andres et al. |
| 4,828,711 A | 5/1989 | Cohen |
| 4,961,841 A | 10/1990 | Andres et al. |
| 5,127,586 A | 7/1992 | Oder |
| 5,143,599 A | 9/1992 | Derdall et al. |
| 5,205,414 A | 4/1993 | Martinez |
| 5,356,015 A | 10/1994 | Notebaart et al. |
| 5,470,554 A | 11/1995 | Schmidt et al. |
| 5,496,526 A | 3/1996 | Pojar et al. |
| 5,560,493 A | 10/1996 | Perry |
| 5,568,869 A | 10/1996 | Turkenich et al. |
| 5,651,465 A | 7/1997 | Schmidt et al. |
| 5,736,113 A | 4/1998 | Hazen et al. |
| 5,911,959 A | 6/1999 | Wold et al. |
| 5,927,508 A | 7/1999 | Plath |
| 5,961,055 A | 10/1999 | Lehtinen |
| 6,065,605 A | 5/2000 | Korpela et al. |
| 6,092,665 A | 7/2000 | Schmidt et al. |
| 6,173,840 B1 | 1/2001 | Pruszko et al. |
| 6,186,335 B1 | 2/2001 | Arrington-Webb et al. |
| 6,264,842 B1 | 7/2001 | Boehm |
| 6,312,511 B1 | 11/2001 | Bilimoria et al. |
| 6,399,038 B2 | 6/2002 | Ninane et al. |
| 6,479,025 B2 | 11/2002 | Denham, Jr. et al. |

OTHER PUBLICATIONS

"Inprosys® Rare-Earth Roll Separator," Outokumpu Technology, Inc., 6100 Philips Highway, Jacksonville, FL 32216—Company Brochure Outlining Principle of Operation, Applications, Systems, and Models, Obtained Aug. 24, 2004, 4 pages.

"Inprosys® Laboratory Magnetic Roll Separator," Outokumpu Technology, Inc., 6100 Philips Highway, Jacksonville, FL 32216—Article Obtained from Internet Address: http://www.outokumpu.com, Aug. 24, 2004, 3 pages.

"Ionizing Bar from Haug North America," Haug North America, 1200 Aerowood Drive, Units 14 & 15, Mississauga Ontario L4W 2S7—Article Obtained from Internet Address: http://www.haug-static.com/Ionizing_Bar.html, Aug. 24, 2004, 4 pages.

*Primary Examiner*—Steven Bos
(74) *Attorney, Agent, or Firm*—Brinks Hofer Gilson and Lione

(57) ABSTRACT

A process for the beneficiation of trona includes supplying a trona feedstream that is crushed and dried. The trona is then separated into a first size fraction and a second size fraction. Impurities are removed from the first size fraction using at least one magnetic separator. The magnetic separator includes a plurality of stages. Each stage includes a conveyor system comprising a first end, a second end, and a conveyor belt. Each stage also includes a magnetic roller disposed at the second end of the conveyor system and a splitter disposed adjacent the second end of the system for separating a fraction of magnetic impurities from the trona to create a beneficiated fraction. At least one conveyor belt is deionized. Airborne dust particles are removed from an area surrounding at least one conveyor system.

22 Claims, 3 Drawing Sheets

MAGNETIC SEPARATION PROCESS FOR TRONA

BACKGROUND

Trona is a mineral that contains about 85-95% sodium sesquicarbonate dihydrate ($Na_2CO_3 \cdot NaHCO_3 \cdot 2H_2O$). A vast deposit of mineral trona is found in southwestern Wyoming near Green River. This deposit includes beds of trona and mixed trona and halite (rock salt or NaCl) which covers approximately 2,600 $km^2$. The major trona beds range in size from less than 428 $km^2$ to at least 1,870 $km^2$. By conservative estimates, these major trona beds contain about 75 billion metric tons of ore. The different beds overlap each other and are separated by layers of shale. The quality of the trona varies depending on its particular location in the stratum. Because trona is found contiguous to shale, the trona ore frequently contains shale impurities. Because shale impurities are undesirable in the product, there is a need to develop processing technologies to remove such impurities from trona.

SUMMARY

In one aspect, a process for the beneficiation of trona is provided. A feedstream comprising trona ore is supplied. The trona is crushed and dried. The trona is then separated into a first size fraction and a second size fraction. Impurities are removed from the first size fraction using at least one magnetic separator. The magnetic separator includes a plurality of stages. Each stage includes a conveyor system comprising a first end, a second end, and a conveyor belt. Each stage also includes a magnetic roller disposed at the second end of the conveyor system and a splitter disposed adjacent the second end of the conveyor system for separating a fraction of magnetic impurities from the trona to create a beneficiated fraction. At least one conveyor belt is deionized. Airborne dust particles are removed from an area surrounding at least one conveyor system.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION

Figure 1:
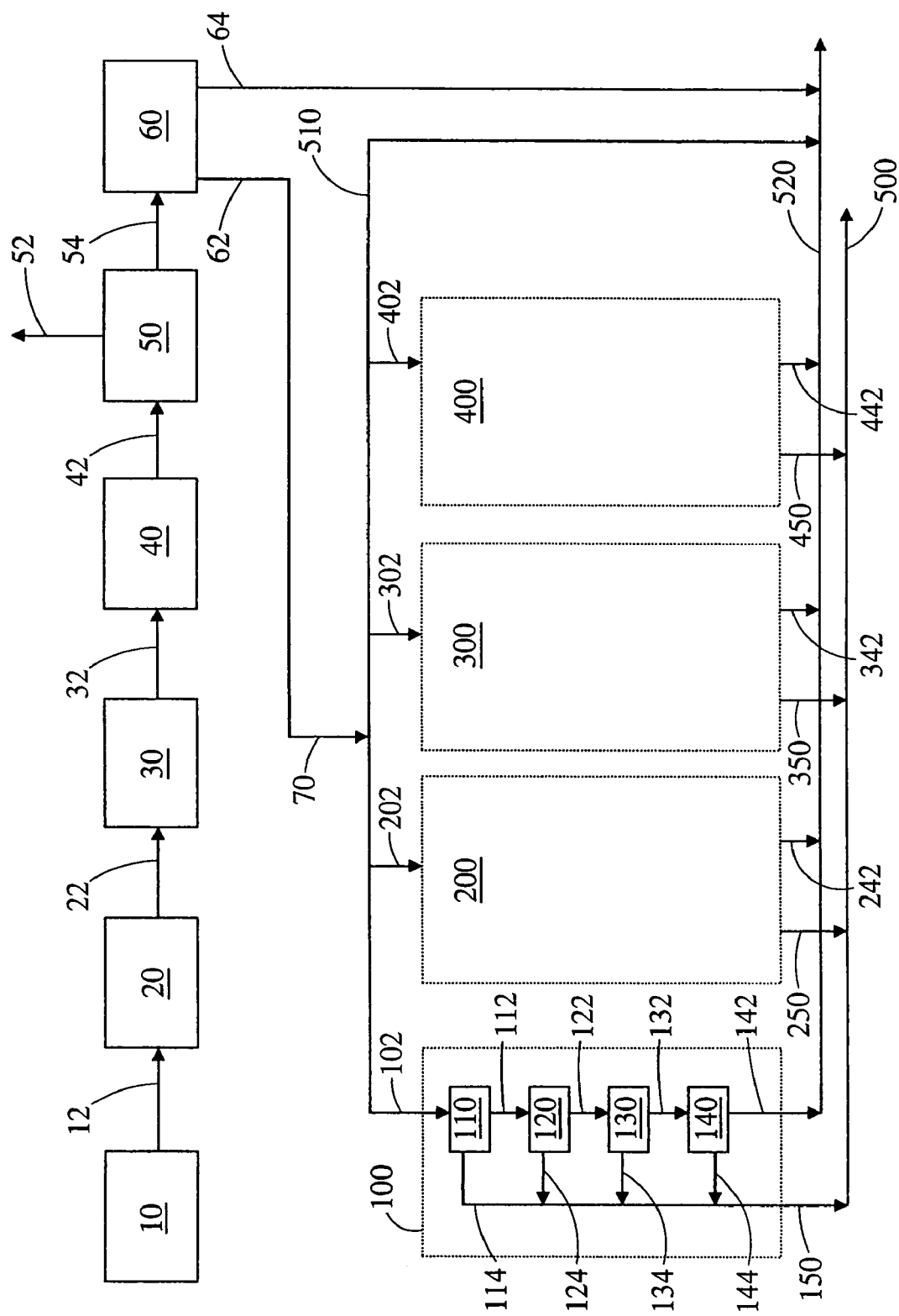
FIG. 1 shows a process flow diagram of an embodiment of a method for beneficiating trona.

The invention is described with reference to the drawings. The relationship and functioning of the various elements of this invention are better understood by the following detailed description. However, the embodiments of this invention as described below are by way of example only, and the invention is not limited to the embodiments illustrated in the drawings.

A process is used to beneficiate trona ore by removing magnetic impurities. The general process includes a mechanical separation process to size the trona ore and a magnetic separation process to remove impurities. As shown in FIG. 1, in one embodiment the process includes a trona source 10, a crusher 20, a first separator 30, a dryer 40, a second separator 50, a third separator 60, and magnetic separators 100, 200, 300, and 400.

The trona source 10 may be raw trona from a mine or it may be previously processed trona ore. A stream of trona 12 is fed to a crusher 20 and a separator 30. In one embodiment, the separator is a mechanical screener. In a typical separator, the particulate matter is mechanically screened at a certain mesh size, with the portion passing through the screen referred to as smaller than the mesh size and the portion not passing through the screen referred to as larger than the mesh size. Thus, as used herein, the phrase "smaller than a given mesh size" means having a particle size equivalent to the fraction passing through a mechanical screen of the given mesh size, and "larger than a given mesh size" means having a particle size equivalent to the fraction retained by a mechanical screen of the given mesh size. In one embodiment, the stream of crushed trona 22 is fed to the separator 30, and the separator screens the crushed trona at 11 mesh. The trona may be screened at other mesh sizes, such as 10, 12, 14, 16, or 18 mesh sizes. The portion 32 smaller than the mesh size of separator 30 is then dried.

In one embodiment, the portion 32 is dried in a gas-fired fluid bed dryer 40. The incoming air stream or gas stream temperature may be greater than about 500.degree. F., preferably greater than about 600degree. F. In one embodiment, the portion 32 is dried at a trona particle temperature of less than about 110.degree. F. The residence time of the trona in the drier is between about 1 min and about 5 min, preferably about 3 min. Drying the trona helps to prevent it from clumping and also improves the efficiency of the separation steps.

After drying, the trona stream 42 is separated at stage 50 into a first size fraction 54 and a second size fraction 52. The separation may be accomplished by a mechanical screening process. The mesh size of separator 50 may be selected as 100 mesh, 140 mesh, or 200 mesh. The resulting first size fraction is larger than 100 mesh, 140 mesh, or 200 mesh, respectively. The trona fraction 54 larger than the mesh size is the fraction which is beneficiated. The second fraction 52 may be smaller than the 100 mesh, 140 mesh or 200 mesh size and may be used as another product.

The drying step 40 and separation step 50 may be combined into a single process. In this embodiment, a fluid bed dryer also acts as a particle separator. A second fraction 52 is collected from the air exiting the fluid bed dryer. The air velocity of the fluid bed dryer may be adjusted to control the size of the collected particle size fraction. As the air velocity increases, the size of the second fraction 52 also increases. The second fraction 52 may be smaller than a nominal mesh size of 100 mesh, 140 mesh, or 200 mesh.

In one embodiment, the first size fraction 54 is subjected to a second separation process 60. The separation may be accomplished by a mechanical screening process. The second separation process 60 removes a small particle size fraction or fines 64 from stream 54. The separator mesh size may be selected from 30, 40, 50, or 70 mesh size. The size of the separator mesh may be adjusted so that fines 64 have a predetermined purity level of sodium sesquicarbonate dihydrate. The fines 64 are then added to the product stream 520. The size fraction 62 larger than the mesh size becomes the feed 70 for the magnetic separators.

Depending on whether the process includes a second separation process 60, the feed steam 70 to the magnetic separators is either the first size fraction 54 or the larger size fraction 62 from the second separator 60.

As shown in FIG. 1, in one embodiment the feed stream 70 is divided into between one and four streams 102, 202, 302, and 402 to feed magnetic separators 100, 200, 300, and 400. The number of streams depends on the capacity of the individual magnetic separators and the desired production rate for the overall process. Each magnetic separator is preferably a multi-stage magnetic roll separation process. The magnetic separators generally operate at normal ambient conditions (atmospheric pressure and temperature between 40° F. and 110° F.). In one embodiment, the magnetic separators operate at ambient conditions of about 70° F.

Each step of the magnetic separator subjects the trona ore to conditions such that materials of different magnetic susceptibility separate from each other into a beneficiated fraction and an impurities fraction. The magnetic separation step is accomplished by a rare earth magnetic separation method. With regard to the beneficiation of trona, typical impurities can be removed during the magnetic separation step include shale, which has a higher magnetic susceptibility than trona.

Figure 2:
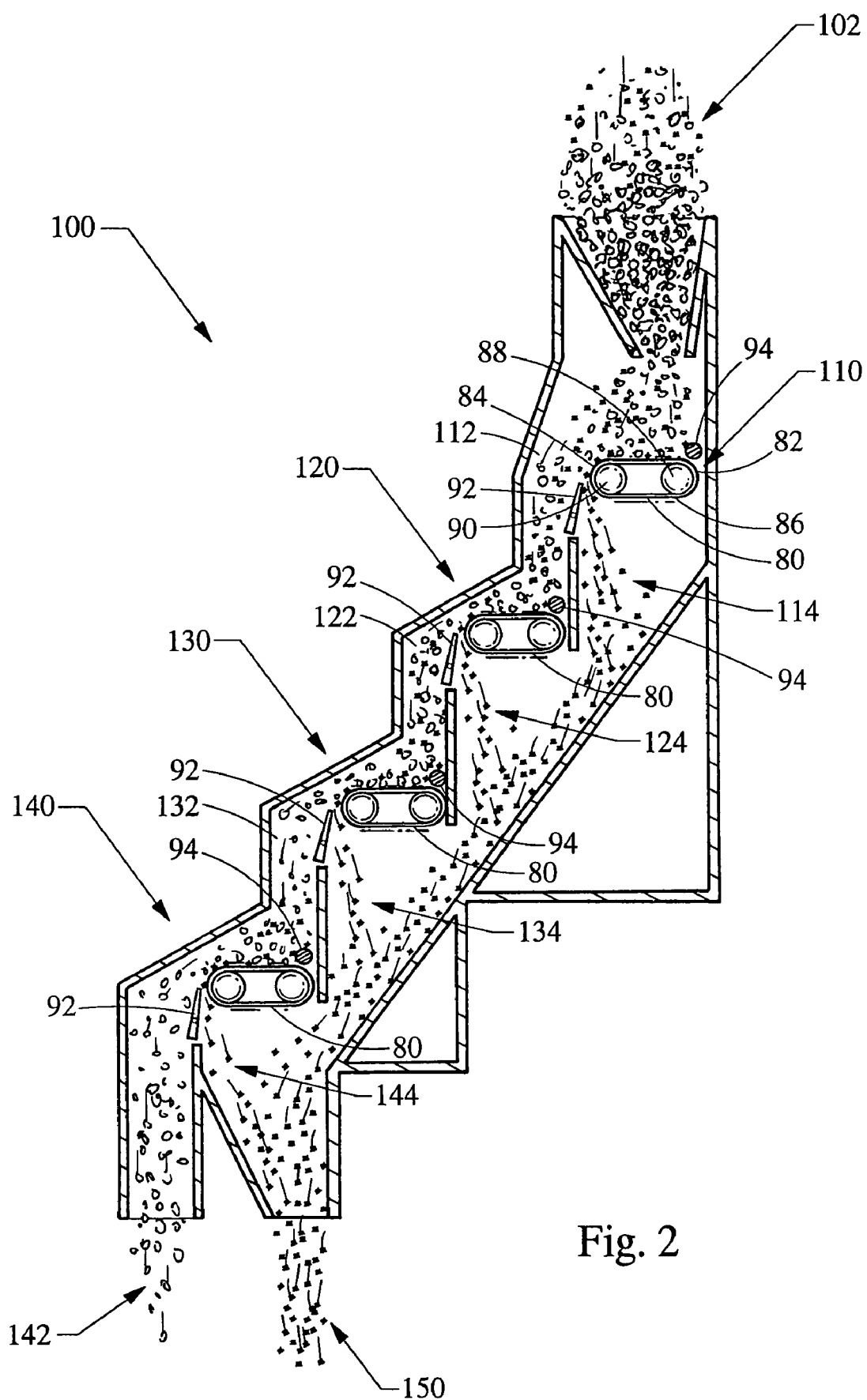
FIG. 2 is a side view of an embodiment of a magnetic separator.

The process may include as few as one or up to four or more magnetic separation stages. As shown in FIGS. 1 and 2, using magnetic separator 100 as an example, the first stage 110 removes a fraction of magnetic impurities 114 from the trona feedstream 102. After the first stage 110, the beneficiated fraction 112 is passed to the second magnetic separation stage 120 for further separation. A fraction of magnetic impurities 114 is sent to a waste stream 150. Similarly, the next stage 120 separates a fraction of magnetic impurities 124 and a beneficiated fraction 122. The beneficiated fraction 122 proceeds to the next stage 130, and the magnetic impurities fraction 124 is sent to a waste stream 150. The next stage 130 separates a magnetic impurities fraction 134 and a beneficiated fraction 132. The beneficiated fraction 132 proceeds to the next stage 140, and the magnetic impurities fraction 134 is sent to a waste stream 150. Finally, stage 140 separates magnetic impurities 144 and a final beneficiated fraction 142. The final beneficiated fraction 142 proceeds to product stream 520, and the magnetic impurities fraction 144 is sent to a waste stream 150.

Figure 3:
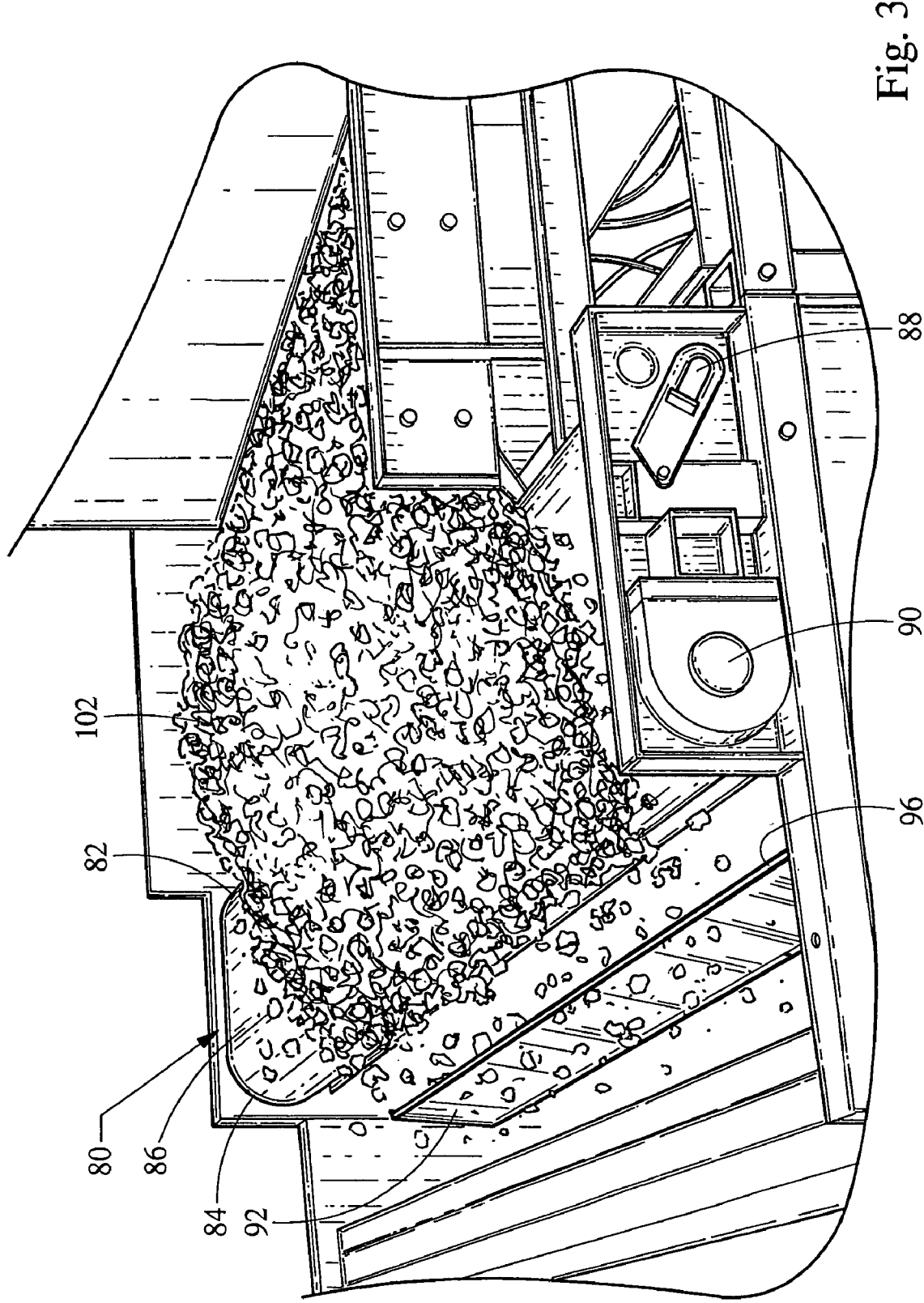
FIG. 3 is a perspective view of one stage of an embodiment of a magnetic separator.

Each stage of the magnetic separator uses a rare earth roll magnet to separate magnetic material from the non-magnetic material. In one embodiment, the separation is conducted using a four-stage high-force HS10-164:150 magnetic roll separator commercially available from Outo-kumpu Technology, Inc. of Colorado. An embodiment of a four stage magnetic separator 100 is shown in FIG. 2. As shown in FIGS. 2 and 3, a conveyor system 80 is used in each stage of the separator to transport the material streams. Each conveyor system 80 includes a first end 82, a second end 84, and a conveyor belt 86. In one embodiment, the material flow rate is between about 2 and about 6 tons/hour, preferably about 3.6 tons/hour, and the rollers are about 1.5 m wide. Other flow rates and roller widths are possible. The flow rates and roller speeds may be adjusted to control the May 25, 2006 purity and yield of the product. The belt 86 may be made from graphite coated Kevlar® or polyurethane covered polyester fabric. The conveyor belt 86 loops around a magnetic rare earth roller 90 and a tail pulley 88.

Material is fed onto the conveyor belt 86. As the feed material moves through the magnetic field magnetic particles are attracted to the magnetic roller. Depending on the magnetic susceptibility of the particle it either 1) becomes attached to the surface of the belt and is subsequently released as it travels away from the magnetic field; or 2) is drawn toward the belt and its trajectory altered from that of the nonmagnetic particles as they are thrown from the rotating roll. Magnetic material has a greater affinity for the magnetic roll than the nonmagnetic material. Thus, the trajectory of the non-magnetic stream 112 is higher than that of the magnetic stream 114. A splitter 92 controls the separation of the magnetic and non-magnetic streams. The vertical and horizontal location of the splitter 92 may be adjusted to control the separation to obtain a desired product purity at desirable yields. In one embodiment, the splitter 92 has a knife edge 96.

In one embodiment, the first stage 110 removes tramp metal from the trona feedstream. Tramp metal is an undesirable impurity and can also damage the conveyor belts of the later stages in the process. For this use, the magnetic field of the magnetic roll 90 is weaker and the conveyor belt 86 is heavier than the other three units to avoid tearing up the conveyor belt 86.

As shown in FIG. 1, the feed stream 70 may be split into streams 102, 202, 302, and 402. In various embodiments, the magnetic separation process uses parallel magnetic separators 200, 300, and 400 in addition to separator 100. Magnetic separators 200, 300, 400 operate on the same principles as separator 100. However, the sizes and/or number of stages of separator 100, 200, 300, and 400 may be different. Magnetic separators 200, 300, 400 remove a fraction of impurities, from a size fraction having a particle size larger than the mesh size of the particular mechanical separator located upstream, which are fed to impurity streams 250, 350, and 450. Impurity streams 250, 350, and 450 combine with stream 150 to form waste stream 500. Product fractions 242, 342, and 442 exit their respective magnetic separators 200, 300, and 400 and merge with each other and beneficiated fraction 142 to form product stream 520.

Because the quality of the feed stream 10 and feed stream 70 may vary with time, it may not be necessary for the entire feed stream 70 to undergo magnetic separation. For example, if the purity of product stream 520 is higher than necessary, a trona stream 510 bypasses the magnetic separators and goes directly to the product stream 520. This may allow one or more of magnetic separators 100, 200, 300, and 400 to be bypassed, thus reducing operating costs. Thus, in one embodiment, a stream 510 bypasses the magnetic separators and combines with the beneficiated product stream 520. In one embodiment, the quality of product stream 520 may be monitored, and the flow rate of stream 510 controlled to produce a product at a predetermined weight percentage of sodium sesquicarbonate dihydrate. If the purity of product stream 520 is higher than necessary, the flow rate of stream 510 is increased. Conversely, if purity of product stream 520 begins to decrease, the flow rate of stream 510 is decreased. This feedback system may be manually or automatically controlled.

The efficiency of the magnetic separation process may be affected by the presence of small particles. In particular, small particles can stick to the conveyor belt 86, reducing the separation efficiency. Small particles can also create dust which tends to get in the various components of the magnetic separator. A small particle fraction stream 64 may be removed from the feed stream before introducing the size fraction stream 70, having a larger size fraction than the mesh of the particular mechanical separator located upstream, into the magnetic separator. The smaller particles tend to be relatively pure trona, so they may not need to be subjected to magnetic separation. Furthermore, the smaller particles that end up in the reject streams of the magnetic separators tend to be of higher purity trona, so it is undesirable to discard them as rejects. The size fraction stream 70 is fed through at least a first magnetic separator to remove magnetic impurities and create beneficiated trona. The separated small size fraction stream 64 is combined with the beneficiated trona to create product stream 520, as shown in FIG. 1.

At least some of the belts of the separators are equipped with deionizers 94, as shown in FIG. 2. The deionizers 94 neutralize or deionize the static charge on the belts to prevent dust particles from adhering to the belt. In one embodiment, the deionizers are disposed adjacent the tail pulleys 88 of at least some of the conveyor systems 80. The deionizer 94 has a series of pins sticking out of it that make contact with the conveyor belt. The high voltage pins of the deionizer neutralize or deionize the static charge on the surfaces of dust particles, so the particles aren't attracted to the conveyor belts. In one embodiment, an ionizing bar from Haug North America Haug (model EI-VS 03.8020.000) is used to deionize the conveyor belt.

The dust particles can be removed from the magnetic separator by a dust collector. The dust collector sucks air out of the magnetic separator to remove dust from the air surrounding the conveyor belts. The dust collectors may be positioned in the housing of the magnetic separator. Each magnetic separator may have one or more dust collectors.

As described above, a variety of process parameters may be adjusted to achieve beneficiated trona product at a predetermined sodium sesquicarbonate dihydrate purity level. The feed rate to each separator can be individually controlled. A trona stream 510 may be used to bypass the magnetic separators and go directly to the product stream 520. The first size fraction 54 may subjected to a second separation process 60 to removes a small particle size fraction 64, which is then added to the product stream 520. Additionally, the roller speed and splitter position of each individual stage of the magnetic separation process may also be adjusted.

EXPERIMENTAL EXAMPLES

A stream of raw crushed trona was, screened at either 11 mesh or 16 mesh. The portion smaller than the mesh size was dried in a gas-fired fluid bed dryer at around 110° F. where −200 mesh size particles were removed. The dried trona was then fed to a magnetic separator. The magnetic separator was a three-stage high-force HS10-164:50 magnetic roll separator commercially available from Outokumpu Technology, Inc. The magnetic rollers were 0.5 m wide and 10 cm in diameter. The rollers of each stage of the magnetic separator were operated at a roll speed of 100 rpm. The feed rate was 2.0 tons per hour, equaling 4.0 tons per hour per meter of magnet width.

Runs 1 through 4, shown in Table 1, used a feed of −11 mesh size trona. A deionizer was positioned adjacent the tail pulley of each conveyor system.

Runs 5 through 7, shown in Table 2, used a feed of −16 mesh size trona. A deionizer was positioned adjacent the tail pulley of the first stage conveyor system, and adjacent both the tail and head pulley in the second stage conveyor system.

TABLE 1

% as sodium sesquicarbonate dihydrate

| Run | Feed | Product | Total Rejects | 1st Roll Reject | 2nd Roll Reject | reject wt % |
|---|---|---|---|---|---|---|
| 1 | 90.0 | 95.6 | 80.0 | 55.4 | 90.1 | 30.3 |
| 2 | 90.0 | 93.2 | 74.5 | 50.4 | 82.5 | 27.5 |
| 3 | 88.0 | 94.9 | 85.0 | 41.6 | 73.4 | 32.9 |
| 4 | 86.2 | 92.1 | 74.0 | 31.5 | 83.4 | 28.3 |

TABLE 2

% as sodium sesquicarbonate dihydrate

| Run | Feed | Product | Total Rejects | 1st Roll Reject | 2nd Roll Reject | reject wt % |
|---|---|---|---|---|---|---|
| 5 | 88.0 | 94.9 | 85.0 | 41.6 | 73.4 | 32.9 |
| 6 | 86.2 | 92.1 | 74.0 | 31.5 | 83.4 | 28.3 |
| 7 | 87.2 | 91.8 | 75.7 | 30.4 | 84.5 | 22.6 |

Tables 1 and 2 show an analysis of the composition (as weight percent sodium sesquicarbonate dihydrate) of the trona feed, the beneficiated product, the total rejects, and the first and second roll rejects, as well as the rejects as a weight percent of the feed. The weight percent sodium sesquicarbonate dihydrate was measured using acid/base titration analysis. From Tables 1 and 2 it can be seen that the magnetic separator was effective in beneficiating trona to greater than 90% sodium sesquicarbonate dihydrate, with a yield in the 70% range.

Table 3 shows the composition of the feed, rejects, and product for Run 4 above, as weight percent sodium sesquicarbonate dihydrate. Table 4 shows the amount of iron (on a weight basis) as a function of size fraction in the feed, rejects, and product for Run 4 above. It can be seen that the −40 size fraction has a higher purity and lower iron content than the +40 size fraction, and that the iron content tends to decrease with decreasing particle size. Also, the rejects of −40 particle size are relatively high purity sodium sesquicarbonate dihydrate, so it may be undesirable to discard these rejects. Thus, as described above, it may be beneficial to remove smaller size particles before the magnetic separation step and reintroduce them to the product after the magnetic separation step.

TABLE 3

% sodium sesquicarbonate dihydrate

| Fraction | Feed | Rejects | Product |
|---|---|---|---|
| +12 | — | — | — |
| −12 +16 | 83.93 | 21.55 | 93.15 |
| −16 +20 | 87.97 | 41.42 | 92.30 |
| −20 +30 | 87.49 | 62.59 | 95.63 |
| −30 +40 | 88.39 | 78.81 | 96.00 |
| −40 +50 | 90.37 | 85.46 | 96.24 |
| −50 +70 | 92.26 | 90.17 | 96.83 |
| −70 +100 | 94.41 | 93.60 | 95.52 |
| −100 +140 | 97.28 | 96.53 | 97.23 |
| −140 +200 | 99.30 | 98.04 | — |
| −200 | — | — | — |

TABLE 4

| Fraction | Feed ppm Fe | Rejects ppm Fe | Product ppm Fe |
|---|---|---|---|
| +12 | — | — | — |
| −12 +16 | 320.4 | 1644 | 237.2 |
| −16 +20 | 469.7 | 1325 | 180.7 |
| −20 +30 | 389.2 | 949.3 | 119.2 |
| −30 +40 | 364.9 | 668.8 | 93.26 |
| −40 +50 | 324.7 | 481.9 | 78.78 |
| −50 +70 | 288.5 | 337.9 | 60.39 |
| −70 +100 | 195.9 | 197.3 | 48.70 |
| −100 +140 | 112.5 | 107.4 | 45.86 |
| −140 +200 | 74.52 | 71.8 | — |
| −200 | — | — | — |

Table 3 shows the composition of the feed, rejects, and product for Run 4 above, as weight percent sodium sesquicarbonate dihydrate. Table 4 shows the amount of iron (on a weight basis) as a function of size fraction in the feed, rejects, and product for Run 4 above. It can be seen that the small particle size fraction that is smaller than about 40 mesh size (i.e., −40 size fraction) has a higher purity and lower iron content than the +40 size fraction, and that the iron content tends to decrease with decreasing particle size. Also, the rejects of −40 particle size fraction are relatively high purity sodium sesquicarbonate dihydrate, so it may be undesirable to discard these rejects. Thus, as described above, it may be beneficial to remove smaller size particles before the magnetic separation step and reintroduce them to the product after the magnetic separation step.

What is claimed is:

1. A process for the beneficiation of trona comprising:
supplying a feedstream comprising trona; crushing the trona; drying the trona;
separating the dried trona into a first fraction and a second fraction, the first fraction having a nominal mesh size larger than the nominal mesh size of the second fraction;
introducing the first fraction to at least one magnetic separator to remove magnetic impurities, wherein the magnetic separator comprises at least two stages in series, each stage comprising:
a conveyor system comprising a first end, a second end, and a conveyor belt;
a magnetic roller disposed at the second end of the conveyor system; and
a splitter disposed adjacent the second end of the conveyor system for separating a fraction of magnetic impurities from the trona to create a beneficiated fraction, wherein the beneficiated fraction from the first stage is fed to the second stage; deionizing at least one conveyor belt; and
removing airborne dust particles from an area surrounding at least one conveyor system.

2. The process of claim 1 wherein crushing the trona comprises crushing the trona to a size of less than about 11 mesh.

3. The process of claim 1 wherein the first fraction is larger than about 140 mesh size and the second fraction is smaller than about 140 mesh size.

4. The process of claim 1 wherein a stream of the beneficiated fraction is disposed above the splitter.

5. The process of claim 4 wherein the splitter has a knife-edge and is adjustable in position.

6. The process of claim 1 wherein the at least two stages comprises a final stage and wherein the beneficiated fraction of the final stage comprises at least about 90 weight percent sodium sesquicarbonate dihydrate.

7. The process of claim 1 wherein at least some of the stages comprise a deionizer disposed adjacent the first end of the conveyor belt to deionize the conveyor conveyer belt.

8. The process of claim 1 further comprising separating a portion of the first fraction of trona before introducing it to the magnetic separator and combining the separated portion with the beneficiated trona to obtain a beneficiated trona having at least a predetermined weight percent of sodium sesquicarbonate dihydrate.

9. The process of claim 1 further comprising separating the first fraction into a large particle size fraction and a small particle size fraction, using the large particle size fraction as the first fraction introduced to the magnetic separator, and combining the small particle size fraction to the beneficiated trona in sufficient amount to produce a beneficiated trona product having a predetermined weight percentage of sodium sesquicarbonate dihydrate.

10. The process of claim 1 further comprising mechanically screening a small size fraction from the first fraction, wherein the small size fraction has a level of impurities below a predetermined value.

11. The process of claim 10 wherein the small size fraction is smaller than about 40 mesh size.

12. The process of claim 1 wherein the trona is dried at a trona particle temperature of less than about 110.degree. F.

13. The process of claim 12 wherein the trona is dried in a fluidized bed dryer.

14. The process of claim 1 wherein the magnetic separator comprises at least three stages and the beneficiated fraction of the second stage is fed to the third stage.

15. The process of claim 14 wherein the magnetic separator comprises at least four stages and the beneficiated fraction of the third stage is fed to the fourth stage.

16. The process of claim 1 wherein the at least one magnetic separator comprises at least two magnetic separators, wherein the first size fraction of trona is split into at least two streams, each stream feeding a magnetic separator.

17. The process of claim 16 wherein the at least one magnetic separator comprises at least three magnetic separators, wherein the first size fraction of trona is split into a plurality of streams, each stream feeding a magnetic separator.

18. The process of claim 17 wherein the at least one magnetic separator comprises at least four magnetic separators, wherein the first size fraction of trona is split into a plurality of streams, each stream feeding a magnetic separator.

19. A process for the beneficiation of trona comprising:
supplying a feedstream comprising trona;
crushing the trona to a size of less than about 11 mesh;
drying the trona in a gas stream at a trona particle temperature of less than about 110.degree. F.;
separating the trona into a first size fraction and a second size fraction, the first size fraction larger than about 200 mesh size;
introducing the first size fraction into at least one magnetic separator to remove magnetic impurities and create a beneficiated trona fraction, the magnetic separator comprising at least one stage, the at least one stage comprising:
a conveyor system comprising a first end, a second end, and a conveyor belt;
a magnetic roller disposed at the second end of the conveyor system; and
a splitter disposed adjacent the second end of the conveyor system for separating a fraction of magnetic impurities from the first size fraction to create the beneficiated fraction; and
separating a small particle size portion of the first size fraction of trona before introducing the first size fraction to the at least one magnetic separator, and combining the small particle size portion with the beneficiated trona fraction.

20. The process of claim 19 wherein the first size fraction is larger than about 140 mesh size and the second size fraction is smaller than about 140 mesh size.

21. The process of claim 19 wherein the small particle size fraction is smaller than about 40 mesh size.

22. A process for the beneficiation of trona comprising:
supplying a feedstream comprising trona; crushing the trona to a size of less than about 11 mesh;
drying the trona in a gas stream having a temperature of less than about 110.degree. F.;

separating the trona into a first size fraction and a second size fraction, the first size fraction larger than about 200 mesh size;

introducing the first size fraction into at least one magnetic separator to remove the magnetic impurities, wherein the magnetic separator comprises at least three stages, each stage comprising:

a conveyor system comprising a first end, a second end, and a conveyor belt;

a magnetic roller disposed at the second end of the conveyor system; and a splitter disposed adjacent the magnetic roller for separating a fraction of magnetic impurities from the trona to create a beneficiated fraction, wherein the splitter has a knife-edge and is adjustable in position, and wherein the beneficiated fraction of each stage is fed to the next stage;

deionizing at least one conveyor belt; removing airborne dust particles from an area surrounding at least one conveyor belt; and separating a smaller particle size portion of the first size fraction of trona before introducing the first size fraction to the at least one magnetic separator, and combining the smaller particle size portion with the beneficiated trona product.

* * * * *